Aug. 29, 1950 G. MAK 2,520,419
FREQUENCY-MODULATION DEMODULATOR
Filed May 16, 1946
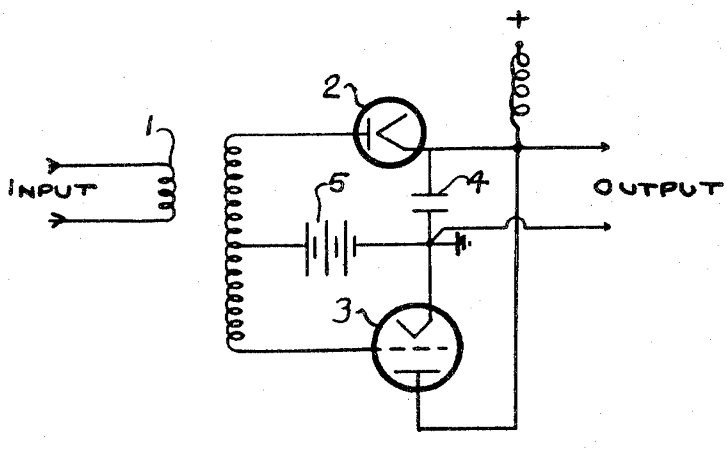
INVENTOR
GERRIT MAK
BY [signature]
ATTORNEY.

Patented Aug. 29, 1950

2,520,419

UNITED STATES PATENT OFFICE 2,520,419

FREQUENCY-MODULATION DEMODULATOR

Gerrit Mak, Sydney, New South Wales, Australia, assignor to Hartford National Bank & Trust Company, Hartford, Conn., as trustee Application May 16, 1946, Serial No. 670,062
In Australia May 8, 1945

Section 1, Public Law 690, August 8, 1946
Patent expires May 8, 1965

4 Claims. (Cl. 250—27)

A common method for demodulating a frequency modulated carrier wave is to pass it through a frequency discriminating circuit so that the frequency modulation is converted into amplitude modulation, the amplitude modulated carrier then being demodulated. When such a method of demodulation is utilized, it is essential that the frequency modulated carrier should be devoid of amplitude modulation and for this reason, it is customary to include a limiter in the pre-discriminator circuits.

It is the primary object of the present invention to provide means for demodulating a frequency modulated carrier directly, without the intervention of either a limiter or a frequency discriminator, the means to be almost independent of the amplitude of the carrier wave provided that the amplitude is in excess of some particular value.

According to the invention suitable means are employed to charge a capacitor in an approximately linear manner in combination with means for the discharge of the capacitor at a rate considerably greater than the charging rate, so that the charging period is dependent upon the frequency of the applied signal.

The invention will now be described with the aid of the accompanying drawing which illustrates a preferred embodiment of the invention.

In the drawing the numeral 1 indicates an input transformer with a tapped secondary winding, the input to the transformer comprising the frequency modulated wave.

One end of the secondary winding of the transformer 1 is connected to the plate, of a diode vacuum tube 2, the cathode of which is connected via a capacitor 4 to the cathode of a triode vacuum tube 3 and directly to the anode of the tube 3. The cathode of the triode 3 is connected to ground and its control grid is connected to the other end of the transformer 1. A source of bias voltage 5 is connected between earth and the centre of the secondary winding of the transformer 1. Direct current supplies for the tube 3 may be provided in any known manner, for example, by connections as shown in the figure.

In the absence of a signal, with this circuit arrangement, current flows from the battery 5 through one half of the secondary winding of the transformer 1, to the diode plate, diode cathode, triode plate, triode cathode and thence to the ground point and back to the battery. Therefore the difference in potential across the capacitor 4 will be equal to the voltage drop across the triode 3. The characteristics of the diode 2 should be such that it is saturated under these conditions.

When a signal of sufficient amplitude is applied to the primary winding of the transformer 1 the diode 2 and the triode 3 will alternate between the conductive and non-conductive conditions. During the half cycle the diode 2 is conductive the triode 3 will be non-conductive and vice versa.

While the diode 2 is conductive, the voltage across the capacitor 4 will rise according to a linear law, the rate of the rise in voltage depending upon the saturation current of the diode and upon the value of the capacity of the capacitor. Provided that the plate current of the triode 3 is greatly in excess of that of the diode 2, the voltage across capacitor 4 will fall rapidly when the triode 3 is conductive.

It therefore follows that the average or mean voltage across the capacitor 4 will be determined by the time of the duration of the half cycle during which the diode 2 is conductive i. e. upon the frequency of the applied signal. Thus the circuit can function as a demodulator of a frequency modulated carrier wave and the modulation frequencies may be abstracted across the terminals of the capacitor 4.

It can be shown that the dependence of the output upon the amplitude of the signal becomes insignificant if the amplitude is reasonably great.

Preferably, the frequency of the input signal should be reasonably low, e. g. of the order of 200 to 400 kilocycles per second.

Having now described my invention, what I claim as new and desire to secure by Letters Patent is:

1. A demodulator for demodulating a frequency-modulated wave, comprising an inductance winding having a central tapping, a capacitor, a rectifier device having one pole thereof coupled to one terminal of said capacitor and the free pole thereof coupled to one end of said inductance winding, means coupling the central tapping of said winding and the remaining terminal of said capacitor, biasing means interposed in said coupling means, means to apply said frequency-modulated wave to said inductance winding thereby to charge said capacitor at an approximately linear rate, an electron discharge device having an anode connected to the junction of the said rectifier device and the said capacitor, a control grid coupled to the remaining end of said winding and a cathode coupled to said remaining terminal of said capacitor thereby to discharge said capacitor at a rate greater than said charging rate whereby the average value of the potential across said capacitor is proportional to the frequency of said frequency-modulated wave.

2. A demodulator for demodulating a frequency-modulated wave, comprising an inductance winding having a central tapping, a capacitor, a saturated rectifier device having one pole thereof coupled to one end of said winding and the free pole thereof coupled to one terminal of said capacitor, means coupling the central tapping of said winding and the remaining terminal of said capacitor, biasing means interposed in said coupling means, an electron discharge device having an anode connected to the junction of the said saturated rectifier device and the said capacitor, a control grid coupled to the remaining end of said winding and a cathode coupled to said remaining terminal of said capacitor, means to apply said frequency-modulated wave to said inductance winding thereby to charge said capacitor at an approximately linear rate during half cycles of one polarity and to discharge said capacitor at a rate greater than said charging rate during half cycles of opposite polarity whereby the mean value of the potential across said capacitor is proportional to the modulation frequency of said frequency-modulated wave, and output terminals coupled to the terminals of said capacitor.

3. A demodulator for demodulating a frequency-modulated wave, comprising an inductance winding having a central tapping, a capacitor, a saturated rectifier device having one pole thereof coupled to one end of said winding and the free pole thereof coupled to one terminal of said capacitor, an electron discharge device having an anode connected to the said free pole of said saturated rectifier device, a control grid coupled to the remaining end of said winding and a cathode coupled to the remaining terminal of said capacitor, biasing means coupling the central tapping of said winding and the junction of the cathode of said electron discharge device and said capacitor, and output terminals coupled to the terminals of said capacitor.

4. A demodulator for demodulating a frequency-modulated wave, comprising an inductance winding having a central tapping, a capacitor, a first electron discharge device having an anode coupled to one end of said winding and a cathode coupled to one terminal of said capacitor, a second electron discharge device having an anode connected to the cathode of said first electron discharge device, a control grid coupled to the remaining end of said winding and a cathode coupled to the remaining terminal of said capacitor, means coupling the central tapping of said winding to the junction of the cathode of said second electron discharge device and said capacitor, biasing means interposed in said coupling means, and output terminals coupled to the terminals of said capacitor.

GERRIT MAK.

REFERENCES CITED

The following references are of record in the file of this patent:

UNITED STATES PATENTS

| Number | Name | Date |
|---|---|---|
| 2,139,467 | Roosenstein | Dec. 6, 1938 |
| 2,299,252 | Pierce | Oct. 20, 1942 |
| 2,416,305 | Grieg | Feb. 25, 1947 |
| 2,416,306 | Grieg | Feb. 25, 1947 |
| 2,417,717 | Tellier | Mar. 18, 1947 |
| 2,457,140 | Frankel | Dec. 28, 1948 |